United States Patent Office 2,797,729
Patented July 2, 1957

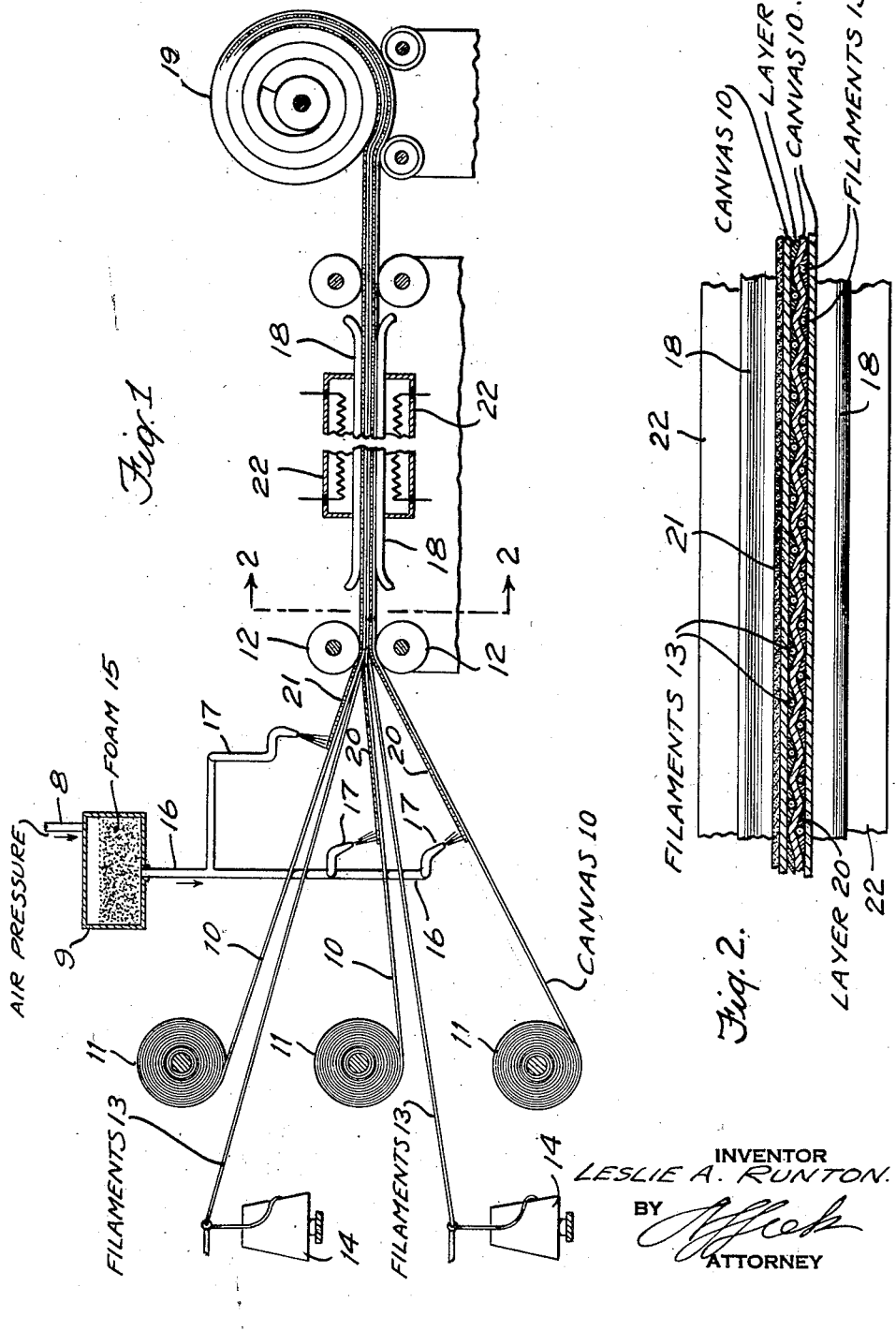

2,797,729
METHOD OF MAKING A CONVEYOR BELT

Leslie A. Runton, Harrison, N. Y., assignor to The Russell Manufacturing Company, Middletown, Conn., a corporation of Connecticut Application October 4, 1955, Serial No. 538,429

1 Claim. (Cl. 154—4)

This invention relates to conveyor belts and has for an object to provide a belt having novel and improved characteristics.

Another object is to provide an improved method of making such a belt.

Another object is to provide a dimensionally stable belt having improved wearing qualities.

Another object is to provide a belt without folding and stitching.

Various other objects and advantages will be apparent as the nature of the invention is more fully disclosed.

In accordance with the present invention the belt is made by laminating several layers of canvas with dimensionally stable commercial synthetic filaments disposed therebetween and with the layers adhered together by a synthetic foam having bonding properties. A layer of such foam is also placed on the face of the belt when required for a protective coating to prevent cutting or tearing of the belt when sharp or hard objects are conveyed thereby.

In this construction the canvas layers may be made of thinner material than that normally used for a belt of the same strength. Added tensile strength is obtained by the use of the dimensionally stable synthetic filaments which are preferably in continuous filament form although fibers embedded in a suitable bonding agent may be used.

The filaments may comprise prestretched, high tenacity rayon tire cord or prestretched nylon tire cord which have a high degree of dimensional stability and a high tensile strength.

The filaments are embedded in a synthetic foam such as polyurethane of the iso-cyanate group which has the property of forming a foam during curing. The above foaming agent also has the adhesive properties required for bonding the various layers together.

The invention will be better understood by referring to the accompanying drawing in which:

Fig. 1 is a diagrammatic view of an apparatus for making the improved belt; and

Fig. 2 is a sectional view of a belt embodying the invention, taken on the line 2—2 of Fig. 1.

Referring to Fig. 1 a plurality of layers of canvas webs 10 are fed from rolls 11 between squeeze rolls 12. Sheets of filaments 13 are fed from creels 14 between each pair of canvas layers 10. The synthetic foam 15 is fed from tank 9, maintained under pressure by air from pipe 8, through pipes 16 and nozzles 17 onto the webs 10 and onto the top face of the belt to form layers 20 and 21 thereof in advance of the squeeze rolls 12.

The squeeze rolls 12 are arranged to squeeze out any excess of foam material to form a laminated product of the desired thickness.

After passing the squeeze rolls 12 the product is passed between plates 18 which maintain the product at the required thickness and exert the necessary pressure for bonding the layers together, and which are provided with heating means 22 to heat the foam to curing temperature. The bonded web is wound upon a roll 19.

The product as shown in Fig. 2 includes layers 10 of canvas, filaments 13 and intermediate layers 20 of the foam. An additional layer of foam 21 is shown as disposed on the face of the belt but may be omitted if surface protection is not required.

The above belt has a high tensile strength and a high degree of dimensional stability due to the filaments 13. The foam layers 20 are compressed to take up the strain on the fabric layer as the belt passes around rolls and the surface layer 21 of foam protects the belt against injury during use.

The belt can be slit into narrow widths if desired.

Synthetic staple fibers can be embedded in the foam layers to replace the continuous filaments if desired although the dimensional stability is usually improved by using untwisted continuous filament bundles of the type above mentioned.

What is claimed is:

The method of making a conveyor belt which comprises feeding a plurality of layers of fabric with sheets of synthetic filaments therebetween between squeeze rolls, applying a layer of a polyurethane foaming agent between said fabric layers in advance of said squeeze rolls, heat curing said foaming agent while confining said layers beyond said squeeze rolls between guide members spaced to form a laminated belt structure having a predetermined thickness.

References Cited in the file of this patent

UNITED STATES PATENTS

| | | |
|---|---|---|
| 1,591,303 | Freedlander | July 6, 1926 |
| 1,746,821 | Davis | Feb. 11, 1930 |
| 2,295,432 | Smith | Sept. 8, 1942 |
| 2,515,778 | Knowland | July 18, 1950 |
| 2,633,976 | Knowland | Apr. 7, 1953 |
| 2,721,158 | Mans | Oct. 18, 1955 |
| 2,723,002 | Gardner et al. | Jan. 24, 1956 |

OTHER REFERENCES

"Polyurethane resins," Modern Plastics, April 1954, pp. 143, 144, 146, 228–229.